US008824672B1

(12) United States Patent
Gomathisankaran et al.

(10) Patent No.: US 8,824,672 B1
(45) Date of Patent: Sep. 2, 2014

(54) RECONFIGURABLE BLOCK ENCRYPTION LOGIC

(75) Inventors: Mahadevan Gomathisankaran, Plainsboro, NJ (US); Akhilesh Tyagi, Ames, IA (US)

(73) Assignee: Iowa State University Research Foundation, Ames, IA (US)

( * ) Notice: Subject to any disclaimer, the term of this patent is extended or adjusted under 35 U.S.C. 154(b) by 1208 days.

(21) Appl. No.: 12/101,411

(22) Filed: Apr. 11, 2008

Related U.S. Application Data

(60) Provisional application No. 60/911,418, filed on Apr. 12, 2007.

(51) Int. Cl.
*H04K 1/00* (2006.01)
*H04K 1/04* (2006.01)
*H04K 1/06* (2006.01)
*G06F 11/30* (2006.01)
*G06F 12/14* (2006.01)

(52) U.S. Cl.
USPC ............................... 380/29; 380/37; 713/189

(58) Field of Classification Search
None
See application file for complete search history.

(56) References Cited

U.S. PATENT DOCUMENTS

| | | | | | |
|---|---|---|---|---|---|
| 4,163,211 | A * | 7/1979 | Miura | ......................... | 340/146.2 |
| 5,201,000 | A * | 4/1993 | Matyas et al. | .................. | 380/30 |
| 6,118,869 | A * | 9/2000 | Kelem et al. | .................... | 380/44 |
| 6,301,362 | B1 * | 10/2001 | Matyas et al. | .................. | 380/37 |
| 6,510,518 | B1 * | 1/2003 | Jaffe et al. | ..................... | 713/168 |
| 6,907,126 | B2 * | 6/2005 | Inada | ............................ | 380/255 |
| 6,922,665 | B1 * | 7/2005 | Guccione et al. | ............... | 703/14 |
| 7,269,738 | B1 * | 9/2007 | Kivimaki | ...................... | 713/189 |
| 7,440,574 | B2 * | 10/2008 | Hanks et al. | ................. | 380/281 |
| 7,725,867 | B2 * | 5/2010 | Gude | ............................ | 716/128 |
| 2003/0215089 | A1 * | 11/2003 | Mihaljevic et al. | ............. | 380/42 |
| 2004/0139211 | A1 * | 7/2004 | Baker et al. | .................... | 709/230 |
| 2005/0231234 | A1 * | 10/2005 | Gude | ............................. | 326/39 |
| 2007/0255941 | A1 * | 11/2007 | Ellis | .............................. | 713/151 |
| 2009/0055638 | A1 * | 2/2009 | Nakano et al. | .................... | 713/1 |

OTHER PUBLICATIONS

Federal Information Processing Standards Publication 197, Nov. 26, 2001, p. 1.*
Federal Information Processing Standards Publication 197, Nov. 26, 2001, p. 1-51.*
Federal Information Processing Standards Publication 197, Announcing the Advanced Encryption Standard (AES), Nov. 26, 2001, 51 pages.
Daemen, Joan et al., "AES Proposal: Rijndael", The Rijndael Block Cipher, AES Proposal, Mar. 9, 1999, 45 pages.

* cited by examiner

*Primary Examiner* — Krista Zele
*Assistant Examiner* — Matthew Lindsey
(74) *Attorney, Agent, or Firm* — McKee, Voorhees & Sease

(57) ABSTRACT

Methods and systems for cryptography use a reconfigurable platform to perform cryptographic functions. Where a reconfigurable platform is use the configuration may be used as a key or secret. The function schema may be maintained as public. The reconfigurable platform may be implemented in a manner to provide desirable families of functions, including reconfigurable functions which are pseudo one-way and pseudo random. An electronic device may include a reconfigurable platform adapted to perform cryptographic functions wherein a configuration of the reconfigurable platform is used as a secret.

18 Claims, 6 Drawing Sheets

RECONFIGURABLE BLOCK ENCRYPTION LOGIC

CROSS-REFERENCE TO RELATED APPLICATIONS

This application claims priority under 35 U.S.C. §119(e) of a provisional application U.S. Ser. No. 60/911,418 filed Apr. 12, 2007, which application is hereby incorporated by reference in its entirety.

BACKGROUND OF THE INVENTION

Cryptography is beginning to pervade all walks of human life for secure cyber transactions. The classical method for encryption/decryption is either asymmetric RSA encryption/decryption (which takes tens of millions of computer cycles per encryption/decryption) or symmetric block ciphers such as NIST standard AES.

Conventional block ciphers ([12, 13]) derive their security from an embedded secret, more commonly referred to as a key. One of the inputs, key, in each round is a secret, whereas the round functions themselves are public. This is a deliberate design decision so that the algorithm can be published as a standard. The secret, however, is combined with the state in a limited way, as an xor, during a round. The xor based mixing of the cipher state and the secret leads to some vulnerabilities based on linear and differential cryptanalysis. The complexity of extracting the secret or its properties is proportional to the non-linearity, among many other attributes, of the round functions.

The prior work abstract the process of encryption in finite field algebra (Galois fields), and then develops hardware/software implementation algorithms. Such indirection causes it to be relatively slower. The security properties are derived from S-boxes that are proved to be non-linear. However, the secret does not participate in S-boxes. Such public knowledge of S-box constants allows for an adversary to develop static statistical models. The secret is merely XORed with the plaintext.

Therefore, there is a need for improvements in cryptography.

BRIEF SUMMARY OF THE INVENTION

Therefore, it is a primary object, feature, or advantage of the present invention to improve over the state of the art.

It is another objective, feature, or advantage of the present invention to provide a method for symmetric encryption/decryption which is more secure than alternative methods.

A further object, feature, or advantage of the present invention is to provide a method for encryption which allows for higher data rates.

A still further object, feature, or advantage of the present invention is to provide a method for encryption/decryption which may be included in hardware in embedded processors such as associated with cell phones, smart cards, wireless routers, and other electronic devices.

Another object, feature, or advantage of the present invention is to provide method of encryption that does not use an XOR key as a secret.

Yet another object, feature, or advantage of the present invention is to provide a schema based on Boolean gates instead of Galois field theory.

A further object, feature, or advantage of the present invention is to provide a method of encryption/decryption which is resistant to cryptanalysis attempts.

A still further object, feature, or advantage of the present invention is to provide a method of encryption or decryption which allows for the use of a key larger than a block size.

One or more of these and/or other objects, features, or advantages of the present invention will become apparent from the specification and claims that follow.

Cryptography is beginning to pervade all walks of human life for secure cyber transactions. The classical method for encryption/decryption is either asymmetric RSA encryption/decryption (which takes 10s of millions of computing cycles per encryption/decryption) or symmetric block ciphers such as NIST standard AES. The present invention provides an alternate method for symmetric encryption/decryption (to replace AES) which is provably more secure and provides encryption and decryption at 10-20 times higher data rates. The last property will allow it to be included in hardware in embedded processors such as cell phones, smart cards (ATM cards), wireless routers and other types of devices.

According to one aspect of the present invention, a method for encryption or decryption is provided. The method includes maintaining function schema associated with the encryption or decryption as public, maintaining configurations of a set of reconfigurable gates as a key, and configuring the set of reconfigurable gates according to the key to perform functions for encryption or decryption.

According to another aspect of the present invention, a system for encryption or decryption is provided. The system includes a fixed logic network of reconfigurable gates adapted for providing a block cipher schema and a configuration associated with the reconfigurable gates. The configuration defines a secret for use in encryption or decryption. The system is adapted for configuring the reconfigurable gates according to the configuration to encrypt or decrypt data.

According to another aspect of the present invention, a method for cryptography, includes providing a reconfigurable hardware platform to perform cryptographic functions, receiving a key defining a configuration for the reconfigurable hardware platform, reconfiguring the reconfigurable hardware platform based on the key, and encrypting or decrypting data using the reconfigurable hardware platform.

According to another aspect of the present invention, an electronic device includes a reconfigurable hardware platform adapted to perform cryptographic functions wherein a configuration of the reconfigurable hardware platform is used as a secret in performing the cryptographic functions.

DETAILED DESCRIPTION OF THE PREFERRED EMBODIMENT

1. Introduction

Figure 1:
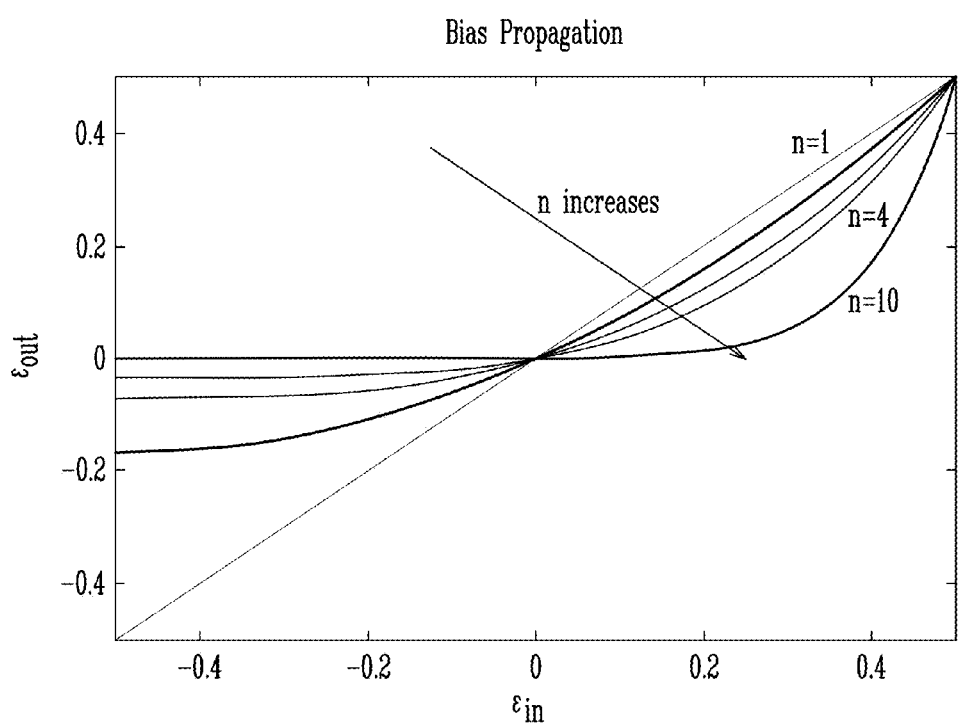
FIG. 1 is bias propagation in n-to-1 Gate.

The present invention provides for an approach wherein the round functions themselves become the secret, while the function schema is a publicly published algorithm. The intuition is to use reconfigurable gates as round functions and define their configurations as the secret (or key). Hence the complexity of such a cryptographic function is derived from the fact that almost all of the round processing is driven by the secret (truth tables). In a traditional block cipher, the secret is combined with the state with an xor as one of the steps in the round. This xor step is susceptible to linear modeling of the secret and input/output relationship. When the secret is used as a Boolean gate truth table, it is inherently non-linear, especially when many levels of such gates are composed, and when each gate is selected to have large minterm degree.

The advantage of such a reconfigurable block encryption logic (REBEL) is that it is highly time-efficient when implemented in hardware. The throughput needs of cryptographic blocks when placed in-line into a processor pipeline in order to support secure execution environments [5, 11]. Another added advantage is that the key-space is much larger than the block length of the encryption function. This provides much higher security levels without having to increase the block length.

In Section 2, the preliminaries needed for understanding the mathematical underpinnings of the invention are provided. This is followed by the introduction of the function family that forms the basis for REBEL in Section 3. Section 4 presents the REBEL schema and its analysis.

2. Preliminaries

2.1 Notations $I_n$ denotes the set of all n-bit strings, $\{0,1\}^n$.

For $x \in I_{2n}$ denote by $x_{|L}$ the first (left) n bits of x and by $x_{|R}$ the last (right) n bits of x.

$G_n^b$ denotes the set of all $I_n \mapsto I_1$ balanced gates (functions).

Let x and y be two bit strings of equal length, then $x \oplus y$ denotes their bit-by-bit exclusive-or.

Let "$\circ$" denote function composition operator, i.e., $f = g \circ g$ implies, $f(x) = g(g(x))$.

Let "$\bullet$" denote concatentation of binary digits, i.e. $p = x \bullet y$ implies, p is a 2N bit string with left N bits containing x and right N bits containing y.

Let $f^{(n)}$ represent the composition of function f n-times i.e., for example $f^{(3)} = f \circ f \circ f$.

Let a gate g be defined over n input bits/variables $\{x_1, x_2, \ldots, x_n\}$. A literal l is defined as either an input variable $x_i$ or its complement $\overline{x}_i$. A minterm is defined as a product of n literals wherein no variable $x_i$ occurs both in complemented and uncomplemented literal form.

$\in_R$ represents the action of choosing uniformly at random an element from a set.

2.2 Properties of $G_n^b$

2.2.1 Cardinality:

$$|G_n^b| = \binom{2^n}{2^{n-1}}.$$

2.2.2 Closed over Complement:

Definition 2.1. A set of gates G is closed over complement if $\forall g \in G$ the complement $\overline{g}$ is also present in G.

Consider a gate $g \in G_n^b$. Then g is balanced and has equal number of zeros and ones in its truth table. The truth table of its complement gate $\overline{g}$ is nothing but the complement of every truth table row of g, i.e. every zero of g will become one and every one of g becomes zero. Hence the number of zeros and ones in $\overline{g}$ is still the same as g. Hence $\overline{g}$ is also balanced and is present in the set $G_n^b$. Thus the set $G_n^b$ is closed over complement.

2.2.3 Symmetry over Input Variables:

Any gate g can be represented as a Boolean function of input variables. Let the set of n input variables to the gate g is $I(g) = \{x_1, x_2, \ldots, x_n\}$. The support set of g, $Sup(g) \subseteq I(g)$, which is the set of all input variables g's value depends on, i.e., if $x_i \in Sup(g)$ then $\delta g/\delta x_i \neq 0$. A set of gates G is symmetric if for each $g \in G$, if any pair of input variables in $Sup(g)$ are swapped in the expression for g leading to a gate g', then $g' \in G$. This property exhibits G's bias towards certain input variables. For example if the set G has more gates with variable xi than any other variables then the set becomes biased towards $x_i$ and any change in $x_i$ is reflected at the output with higher probability than a change in any other input variables.

Definition 2.2. A set of gates G is said to be symmetric in input variables if $\forall g \in G$ the gate g' obtained by swapping any two input variables from the support set of g is also present in G.

For $g \in G_n^b$, the balance property dictates that there be $2^{n-1}$ minterms. A swap of $x_i$ and $x_j$ in the expression for g does not alter the number of 1's (minterms). It merely, recodes the minterm locations. Hence the gate g' derived from g through a swap of two variables will also have $2^{n-1}$ minterms, and hence will be balanced, implying $g' \in G_n^b$. Hence, the set $G_n^b$ is symmetric over input variables. Now on, we will use the term symmetric set G to mean a set symmetric in input variables.

2.2.4 Closed over Variable-Complement:

Definition 2.3. We define a set of gates G as closed over input variable-complement if $\forall g \in G$ the gate g' obtained by complementing all literal instances of an input variable $x_i$ is also present in G.

Let $g \in G_n^b$ and let g' be obtained by complementing the variable $x_i$. Since g is balanced the number of 1's (minterms) is $2^{n-1}$. Each affected minterm gets relocated to a different row in the truth table through complementing of a literal $x_i$ or $\overline{x}_i$. However, the number of minterms still remains at $2^{n-1}$, and hence g' is also balanced. Thus $G_n^b$ is closed over input variable-complement.

2.2.5 Input-Collision Probability:

Definition 2.4. For any gate g, the input-collision probability $p_{coll}^g$ is defined as the probability that any pair of inputs x x' $\in I_n$ s.t. $x \neq x'$, produce the same output, i.e. $p_{coll}^g = P[g(x) = g(x')|g]$. Note that the collision probability is averaged over all the input pairs.

For every $g \in G_n^b$ there are equal number ($2^{n-1}$) of 0's and 1's. For the collision to happen, the input x has $2^n$ out of $2^n$ choices and the input x' has $2^{n-1} - 1$ out of $2^n - 1$ choices. Hence $$p_{coll}^g = \frac{2^{n-1} - 1}{2^n - 1}.$$

2.2.6 Gate-Collision Probability:

Definition 2.5. For any given input $x \in I_n$ gate-collision probability is defined as the probability that any pair of gates g, $g' \in_R G$ collide i.e., $p_{gcoll}^G(x) = P[g(x) = g'(x)|x]$. Note that the collision probability is averaged over all the gate pairs.

The set $G_n^b$ is closed over complement. Hence for every $g \in G_n^b$ the complement gate $\bar{g}$ is also present in $G_n^b$. Thus every row of the truth table for the set is also balanced and $$p_{gcoll}^G(x) = \frac{1}{2}.$$

2.2.7 Set-Collision Probability:

Definition 2.6. For any set of gates G, the set-collision probability $p_{coll}^G(x,x')$ is defined as the probability that any gate $g \in_R G$ collides for any given pair of inputs $x, x' \in I_n$ s.t. $x \neq x'$, i.e, $p_{coll}^G(x, x') = P[G(x) = G(x')|x,x']$, where $$G(x) = \frac{\sum_{g \in G} g(x)}{|G|}.$$

Note that the collision probability is averaged over all the gates in the set G.

In $G_n^b$ for every input pair x, x' the number of gates that collide are $$N_{coll} = 2 \times \binom{2^n - 2}{2^{n-1} - 2}$$

and the number of gates that does not collide are $$N_{\overline{coll}} = 2 \times \binom{2^n - 2}{2^{n-1} - 1}.$$

Hence the probability of collision is $$p_{coll}^G = \frac{N_{coll}}{N_{coll} + N_{\overline{coll}}} = \frac{2^{n-1} - 1}{2^n - 1}.$$

In other words, the set $G_n^b$ is symmetric with respect to every pair x, x'.

2.2.8 Input Symmetric-Controllability:

Definition 2.7 (input pairs equivalence class). Let $p, p' \in I_n$ be the inputs to the gates in the set G. We group the pairs of inputs based on their hamming distance, i.e., we define equivalence class as $S_d = \{(p, p')|h(p, p') = d\}$.

Definition 2.8. A set of gates G is input symmetric-controllable if the collision probability is same for any pair of inputs in the same equivalence class.

Lemma 2.1. Any symmetric set of gates G and closed over variable complement is input symmetric-controllable.

Proof. Let $(p, p'), (q, q') \in S_d$ then the input-symmetry property requires that $P[G(p)=G(p')]=P[G(q)=G(q')]$. The trivial cases are $p=q, p'=q'$ and $p=q', p'=q$. We will prove the non-trivial cases. Let $i_1, i_2, \ldots, i_d$ s.t. $i_1 < i_2 < \ldots < i_d$ represent the d bit-positions in which the pair (p, p') differ and similarly $j_1, j_2, \ldots, j_d$. s.t. $j_1 < j_2 < \ldots < j_d$ represent the d bit-positions in which the pair (q, q') differ.

Case $\{i_1, i_2, i_3, \ldots, i_d\} = \{j_1, j_2, j_3, \ldots, j_d\}$:

Let $k_1, k_2, \ldots, k_{n-d}$ be the bit-positions which do not differ in both the pairs. Then p and q should differ in at least one of these bit-positions. Let $g \in G$ be the gate that collides for the pair (p, p'). Let g' be the gate obtained by changing the literals of g in the following way. $x_{k_i}^{g'} = x_{k_i}^g \oplus p_{k_i} \oplus q_{k_i}$, that is, the literals are complemented in bit-positions where p and q differ. But G is closed over literal-complement. Hence g' is also present in the set G and g' will collide for the pair (q, q').

Case $\{i_1, i_2, i_3, \ldots, i_d\} \neq \{j_1, j_2, j_3, \ldots, j_d\}$:

Let $g \in G$ be a gate that collides for the pair (p, p'). Let g' be a gate such that the input variables are swapped in the following way. Variables $x_{i_l}^{g'} = x_{j_l}^g, x_{j_l}^{g'} = x_{i_l}^g$ that is the variables at positions $i_k$ and $j_k$ are swapped. But the set G is symmetric. Hence g' is also present in the set G and g' will collide for the pair (y, y').

Thus for every gate g that collides for the pair (p, p'), a gate g' that collides for the pair (q, q'), exists. Hence the probability of collisions are same or $P[G(p)=G(p')]=P[G(q)=G(q')]$.

Corollary 2.1. $G_n^b$ is input symmetric-controllable.

Proof. $G_n^b$ is symmetric and closed over variable-complement (Properties 2.2.3 and 2.2.4).

2.2.9 k-Wise Set-Collision Probability:

Let $g_i$ represent $i^{th}$ gate that is chosen independently at random from $G_n^b$. Let $$^k p_{coll}^G = \bigcap_{i=1}^{k} P[g_i(x) = g_i(x')]$$

be the probability that all the k gates collide for any given pair of inputs $x, x' \in I_n$ s.t. $x \neq x'$. Then $^k p_{coll}^G = (p_{coll}^G)^k$ From Property 2.2.7 for every pair of inputs x and x' number of gates that collide in the set $G_n^b$ is $N_{coll}$. That is, the probability of picking a gate from $G_n^b$ such that it collides for any input pair x and x' is $$\frac{N_{coll}}{|G_n^b|}.$$

And this probability is same for all the choices of the gates since they are chosen independently and at random. Hence $^k p_{coll}^G = (p_{coll}^G)^k$.

2.2.10 Bias Propagation:

Let $x \in I_n$ be the input to gate $g \in G_n^b$. Let $x_i$ be the $i^{th}$ bit. Let $\epsilon_{in}$ be the bias of the input bits i.e., the probability that the input bit i collides is $$\frac{1}{2} + \epsilon_{in}.$$

Then the bias at the output $\epsilon_{out}$ is $$\epsilon_{out} = \left(\frac{1}{2} + \epsilon_{in}\right)^n + \left(1 - \left(\frac{1}{2} + \epsilon_{in}\right)^n\right) \cdot \left(\frac{2^{n-1} - 1}{2^n - 1}\right) - \frac{1}{2}$$

And, $$|\epsilon_{out}| \leq |\epsilon_{in}|$$

3 Function Family $F_n^N$

Definition 3.1 ($F_n^N$ function family). $F_n^N$ is a $I_N \mapsto I_N$ family of functions that uses $I_n \mapsto I_1$ reconfigurable gates as the component gates, where, $N = n^{\lfloor \log_n N \rfloor}$.

3.1 Notations

Let $\gamma$ be a reconfigurable gate.

Let $x(\gamma)$ and $y(\gamma)$ be the input and output of the reconfigurable gate respectively.

Let $g(\gamma)$ be the gate implemented by (or the truth table of) the reconfigurable gate.

Let $\Gamma$ be a $I_N \mapsto I_1$ tree using $I_n \mapsto I_1$ reconfigurable gates (or n-ary tree). Then there are $\log_n N$ levels in $\Gamma$ (w log let top level be 1) and $i^{th}$ level has $$\frac{N}{n^i}$$

reconfigurable gates (w log let leftmost gate be 1). FIG. 1 shows the diagrammatic representation of this construction.

Let $N_i^\Gamma$ be the number of gates present at $i^{th}$ level.

Let $\Gamma_{i,j}(\Gamma)$ be the reconfigurable gate at $i^{th}$ level $j^{th}$ position.

Let $\updownarrow$ represent switching of any bit b i.e. $P[b\updownarrow]$ represent the probability that the bit b switches.

Figure 2:
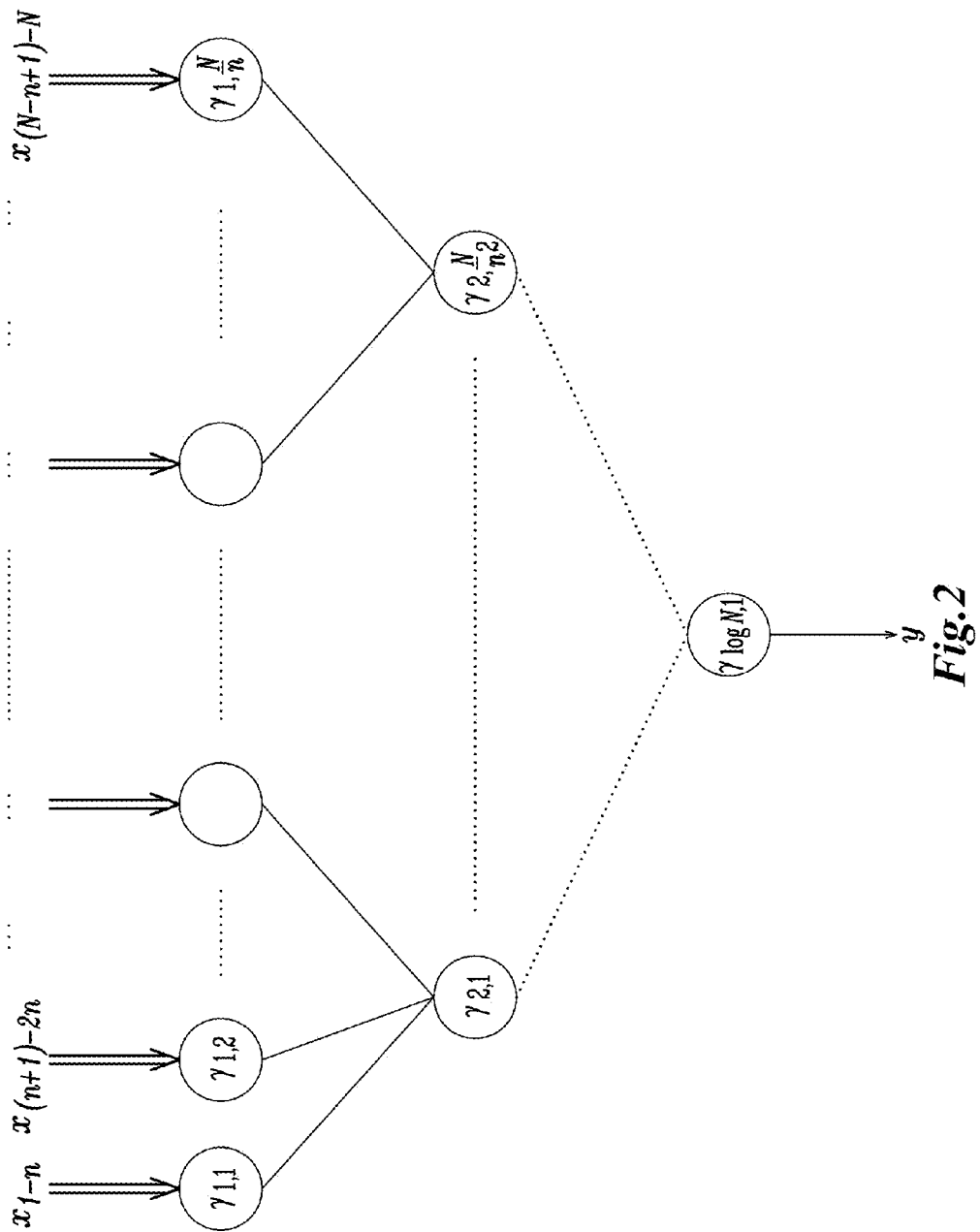
FIG. 2 is diagrammatic representation of $\Gamma$.

3.2 Construction of $F_n^N$ $F_n^N$ is a $I_N \mapsto I_N$ family of functions that uses $I_n \mapsto I_1$ reconfigurable gates as the component gates. $F_n^N$ has N tree-gates ($\Gamma$) each one producing one output bit using the same input bits. Let $\Gamma_i$ be the $i^{th}$ tree-gate (w log let leftmost be 1). FIG. 2 shows this construction. In the figure, x represents the N bit input and $y_i$ represent the $i^{th}$ bit of y which is the N bit output.

The configurations of the reconfigurable gates are connected as $g(\Gamma_{i,j}(\Gamma_k)) = g(\gamma_{p,q}(\Gamma_r))$ where, $$\left(\sum_{t=1}^{i-1} N_t^\Gamma + j + k - 2\right) \% N = \left(\sum_{t=1}^{p-1} N_t^\Gamma + q + r - 2\right) \% N$$

and $$1 \le i, p \le \log_n N, 1 \le j \le \frac{N}{n^i}, 1 \le q \le \frac{N}{n^p},$$

and $1 \le k, r \le N$. Thus only N unique gate configurations are required by $F_n^N$. The configurations are chosen uniformly at random from the set $G_n^b$. The configurations forms the key to function family.

Thus the key space is $K = \{g | g \in G_n^b\}^N$ and its cardinality is $|K| = (|G_n^b|)^N$. Let $\kappa \in K$ and $\kappa_i$ be the $i^{th}$ gate configuration. Then the gate configuration assignments are done as, $g(\gamma_{p,q}(\Gamma_r)) = \kappa_i$ where $i = 1 + (\Sigma_{t=1}^{p-1} N_t^\Gamma + q + r - 2) \% N$ and $$1 \le p \le \log_n N, 1 \le q \le \frac{N}{n^p},$$

and $1 \le i, r \le N$.

Figure 3:
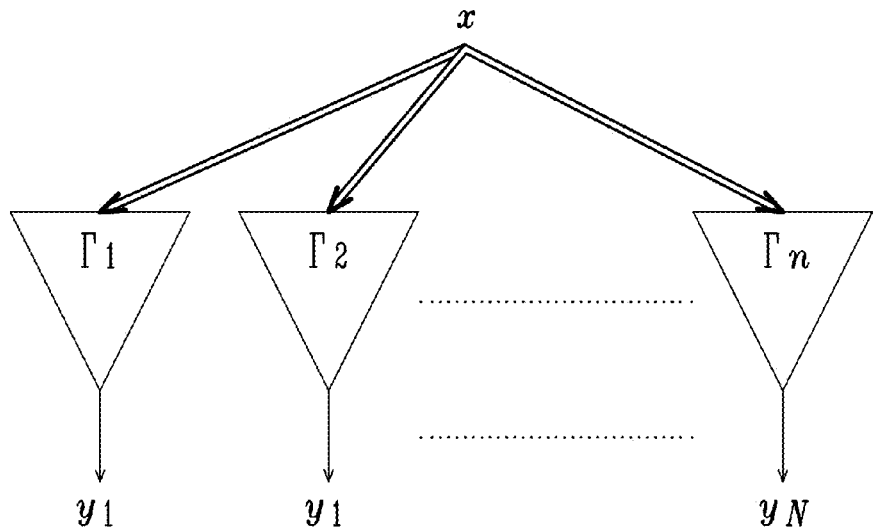
FIG. 3 is diagrammatic representation of $F_n^N$.

The construction can be explained in simpler terms as follows. Consider N columns and $$\frac{N-1}{n-1}$$

rows of reconfigurable gates. Then $i^{th}$ column represents the gates of the tree-gate $\Gamma_i$ and $j^{th}$ row in a column corresponds to the $q^{th}$ gate in $p^{th}$ level such that $j = \Sigma_{q=1}^{p-1} N_t^\Gamma + q$. In every row there are N reconfigurable gates and are assigned N gates from the key i.e., if $\gamma_{i,j}$ represent the reconfigurable gate in $i^{th}$ column and $j^{th}$ row, then $g(\gamma_{i,j}) = \kappa_{(i+j-2) \% N+1}$. FIG. 3 shows the construction diagrammatically.

3.3 Properties of $F_n^N$

Definition 3.2 (input group). N bits of input x to $F_n^N$ are divided into equal sized groups of size n bits. Bits of group -i of x, denoted by grp(x, i), correspond to the input bits of $i^{th}$ reconfigurable gate in level-1 (top level), bits $x_{(i-1)*n+1}, x_{(i-1)*n+2}, \ldots, x_{i*n}$.

Definition 3.3 ($\Delta_g$—difference operator). $\Delta_g$ is a difference operator that takes two N bit values and returns the number of groups in which the two inputs differ, i.e., $\Delta_g(x, x') = i$, where $$i \in \left[0, \frac{N}{n}\right]$$

and $x, x' \in I_N$. Let $\delta_g(x, x') = \{i_1, i_2, \ldots, i_k\}$ such that $0 \le k \le \Delta_g(x, x')$ be the set of group indices where x and x' differ.

Definition 3.4 (group hamming distance operator). Given two N bit values $x, x' \in I_N$ the group hamming distance operator $h_{\Delta_g}$ is defined as, $h_{\Delta_g}(x, x') = [h_{i_1}, h_{i_2}, \ldots h_{i_{N/n}}]$, the set of groupwise Hamming distances in ascending order, i.e., $h_{i_m} = h(grp(x, i_m), grp(x', i_m))$ and $h_{i_p} \le h_{i_q}$ for $p < q$.

3.3.1 Bit-Balance:

Every output bit of every function $f \in F_n^N$ is balanced. This property is derived from the fact that every output is produced by a n-ary tree of balanced gates. Let $x, y \in I_N, f \in F_n^N, y = f(x)$ and $y_i$ be the $i^{th}$ output bit. When averaged over all the inputs to the tree-gate $\Gamma_i$, $P[\Gamma_i(x) = 0] = P[\Gamma_i(x) = 1]$, hence $P[y_i = 1] = P[y_i = 0]$.

3.3.2 Key-Collision Probability:

Definition 3.5. For the function family $F_n^N$ key-collision probability $p_{kcoll}$ is defined as the probability that for a given input $x \in I_N$ any pair of keys $\kappa, \kappa' \in_R K$ produce the same output i.e., $p_{kcoll}(x) = P[f_\kappa(x) = f_{\kappa'}(x) | x]$. Note that the probability is averaged over all the pairs of keys $\kappa, \kappa'$.

To derive this property let us consider each tree individually. Let $\Gamma_i^\kappa$ and $\Gamma_i^{\kappa'}$ be the tree i with keys $\kappa$ and $\kappa'$ respectively. Then the output of trees collide if $\gamma_{\log_n N,1}(\Gamma_i^\kappa) = \gamma_{\log_n N,1}(\Gamma_i^{\kappa'})$. Even though inputs to the trees are the same the inputs to the root node are independent. This follows from the gate-collision property (Property 2.2.6) of $G_n^b$. Consider two level 1 gates $\Gamma_{j,1}(\Gamma_i^\kappa)$ and $\gamma_{j,1}(\Gamma_i^{\kappa'})$. Let $b_j$ and $b'_j$ be their outputs respectively. Then, $P[b_j = x \cap b'_j = y] = P[b_j = x] \cdot P[b_j = y]$ where $x, y \in \{0,1\}$. This is because, $$P[b_j = 0 \cap b'_j = 0] = P[b_j \text{ and } b'_j \text{ collide}] P[b_j = 0] = \frac{1}{2} \cdot \frac{1}{2} = \frac{1}{4}$$

$$P[b_j = 0 \cap b'_j = 1] = P[b_j \text{ and } b'_j \text{ not collide}] P[b_j = 0] = \frac{1}{2} \cdot \frac{1}{2} = \frac{1}{4}$$

$$P[b_j = 1 \cap b'_j = 0] = P[b_j \text{ and } b'_j \text{ not collide}] P[b_j = 1] = \frac{1}{2} \cdot \frac{1}{2} = \frac{1}{4}$$

$$P[b_j = 1 \cap b'_j = 1] = P[b_j \text{ and } b'_j \text{ collide}] P[b_j = 1] = \frac{1}{2} \cdot \frac{1}{2} = \frac{1}{4}$$

Thus output bits of every level 1 gates $\gamma_{j,1}(\Gamma_i^\kappa)$ and $\gamma_{j,1}(\Gamma_i^{\kappa'})$ are independent. Hence the input bits to the root node are independent. Let $g_\gamma = g(\gamma_{\log_n N,1}(\Gamma_i^\kappa))$ and $g'_\gamma = g(\gamma_{\log_n N,1}(\Gamma_i^{\kappa'}))$ and let $x_\gamma$ and $x'_\gamma$ be the inputs to these gates respectively.

Then, probability of key-collision for a tree is given by $P[g_\gamma(x_\gamma)=g'_\gamma(x'_\gamma)]$. Since both the gates $g_\gamma$ and $g'_\gamma$ are balanced the probability of collision is nothing but $$\frac{1}{2}.$$

Since root nodes of every tree are independent, for any input $$x, \; p_{kcoll}(x) = \frac{1}{2^N}.$$

Thus for any input $x \in I_N$ $$p_{kcoll}(x) = \frac{1}{2^N} \quad (3)$$

Another property which follows the key-collision property is the probability that k inputs $x_1, x_2, \ldots, x_k$ chosen uniformly at random from $I_N$ collide i.e., $f_\kappa(x_i)=f_\kappa(x_j) \forall 1 \le i \le k$. Since every input is independent this is nothing but $$\frac{1}{2^{Nk}}.$$

3.3.3 Tree Independence:

For any function $f \in_R F_n^N$ the collision probability for any given pair of inputs, $$x, x' \in I_N \; s.t.,$$

$$x \ne x' \text{ is } P[f(x)=f(x')\,|\,(x,x')] = \bigcap_{i=1}^{N} P[\Gamma_i(x)=\Gamma_i(x')\,|\,(x,x')].$$

W log let x and x' differ in k groups denoted by $i_1, i_2, \ldots, i_k$. From the k-wise set-collision property of $G_n^b$ (Property 2.2.9) the collision probabilities of N level-1 gates in each of the groups $i_1, i_2, \ldots, i_k$ are independent. Similarly the collision probabilities of N gates in the same group in subsequent levels are also independent. Hence the collision probabilities of every tree becomes independent. Thus, $$P[f(x)=f(x')\,|\,(x,x')] = \prod_{i=1}^{N} P[\Gamma_i(x)=\Gamma_i(x')\,|\,(x,x')]$$

Since each tree is similar in structure, the collision probabilities of every tree is same. Thus, $$P[f(x)=f(x')\,|\,(x,x')]=(P[\Gamma(x)=\Gamma(x')\,|\,(x,x')])^N$$

3.3.4 Collision Controllability:

Definition 3.6. Collision controllability $\delta_c$ is the maximum probability with which any two inputs $x, x' \in I_N$ to the function $f \in_R F_n^N$ cause collision, i.e., $\delta_c = \max_{x,x'}\{P[f(x)=f(x')]\}$.

Figure 4:
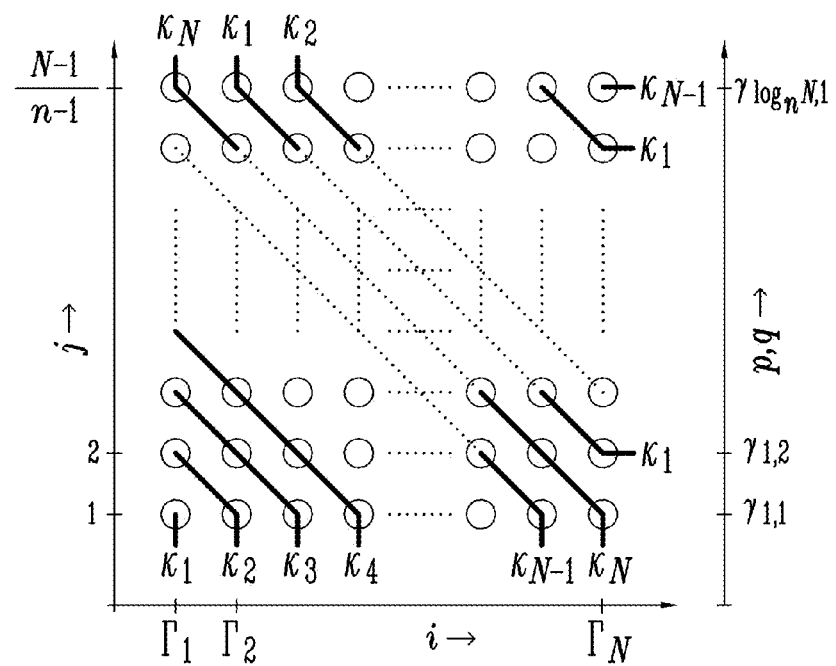
FIG. 4 is construction of $F_n^N$ and Key (Gate Configuration) Assignment.

From Property 3.3.3 the collision probabilities of trees are independent and equal. Hence to maximize the collision probability of f, the collision probability of tree has to maximized. The collision probability of the tree gate will be maximum if inputs to only one gate on the top level switch, i.e., requiring minimum number of gates in the tree to collide. FIG. 4 shows one such path in $\Gamma$. Thus, $$\max_{x,x'}\{P[\Gamma_i(x)=\Gamma_i(x')]\} = \quad (4)$$

$$1 - (1-p_{coll}^g)^{\log_n^N} = 1 - \left(\frac{2^{n-1}}{2^n-1}\right)^{\log_n^N} \Rightarrow \delta_c = \left(1 - \left(\frac{2^{n-1}}{2^n-1}\right)^{\log_n^N}\right)^N$$

3.3.5 Function Family Collision Probability:

Definition 3.7. Function family collision probability is the probability that any two inputs $x, x' \in_R I_N$ s.t. $x \ne x'$ cause collision in any function $f \in_R F_n^N$ i.e., $p_{coll}^f = P[f(x)=f(x')]$. Note that the probability is averaged over all the input pairs and all the functions in the family.

Let $i=\Delta_g(x,x')$ and $p_{group}^i$ be the probability that the inputs with $\Delta_g=i$ cause collision. Let $N_{group}^i$ be number of inputs with $\Delta_g=i$. Then, $$p_{coll}^f = \frac{\sum_{i=1}^{N} N_{group}^i \, p_{group}^i}{\frac{2^N(2^N-1)}{2}} \quad (5)$$

3.3.6 Input-Symmetry:

The function family $F_n^N$ exhibits the following input symmetry. Let $x, x', y, y' \in I_N$, $f \in F_n^N$ and $y=f(x), y'=f(x')$. Let $y_i, y'_i$ be the $i^{th}$ output bit of y and y' respectively. Then, $$P[y_i=y'_i\,|\,(x,x')]=P[y_j=y'_j\,|\,(x,x')]$$

That is, the probability of collision for every output bit is same for any pair of inputs when averaged over all the functions in the family $F_n^N$.

Definition 3.8. We define the property input-symmetry as the probability of collision of every output bit being equal for any input change.

The trivial case is when $x=x'$. We will see the non-trivial case when $x \ne x'$. The collision probability of an output bit is nothing but the collision probability of the corresponding tree $\Gamma_i$. From Property 3.3.3 the collision probabilities of trees are independent and equal for a given pair of inputs. Hence, $P[y_i=y'_i\,|\,(x,x')]=P[y_j=y'_j\,|\,(x,x')]$ for any pair of inputs $x, x'$.

3.3.7 Output-Symmetry:

The function family $F_n^N$ exhibits the following output symmetry. For a randomly selected instance of f from $F_n^N$, the input transition that causes an output transition from y to y' is indistinguishable if the inputs come from the same group equivalence class. This prevents an adversary from extracting any information about differential input instances that caused an observed output change, which captures a typical attack scenario where only the output is observable. We will describe an attack method in Section 3.3.10 where through carefully controlled differential input pairs, it may be possible to infer almost all the top level gates. Output symmetry property prevents that occurrence. The preceding property makes it hard to distinguish between two vectors that cause a $y \to y'$ change. Moreover, even a model that attempts to ascertain a specific input bit position transitions, $x_i \to \bar{x}_i$ and $x_j \to \bar{x}_j$, is also indistinguishable since all the input bit positions cause the output $y \to y'$ change uniformly. Quantitatively, let $f \in_R F_n^N$.

$$P[x_i \updownarrow \,|\,(y,y')]=P[x_j \updownarrow \,|\,(y,y')]$$

That is, the probability of switching for every input bit position is same for any pair of observed output when averaged over all the functions in the family $F_n^N$.

Definition 3.9. A function family F is output-symmetric if for a randomly chosen function instance f∈$_R$ F, for a given output pair (y, y'), $P[x_i \updownarrow |(y, y')] = P[x_j \updownarrow |(y, y')]$ for all $1 \le i, j \le N$.

Definition 3.10. Two pairs of inputs (p, p') and (q, q') are in the same group-equivalence class if the following condition holds. $h_{\Delta_g}(p, p') = h_{\Delta_g}(q, q')$ which also implies $\Delta_g(p, p') = \Delta_g(q, q')$.

Let f∈$_R$ $F_n^N$, x, y∈$I_N$ such that y=f(x). Let x', x"∈$_R$ $I_N$ such that the pairs (x, x') and (x, x") are in the same group-equivalence class. Then given that y has changed to y' output-symmetry property of $F_n^N$ requires that both these pairs be equally probable to have caused the transition. Let $P^f[(y, y')|(x, x')]$ be the probability that y transitions to y' given that the input transitions from x to x'. Then from tree independence property and input-symmetry property (Properties 3.3.3 and 3.3.6), $$P^f[(y, y')|(x, x')] = (P[\Gamma(x) = \Gamma(x')|(x, x')])^{N-h(y, y')}(1 - P[\Gamma(x) = \Gamma(x')|(x, x')])^{h(y, y')}$$

Let $h'_i$ and $h''_i$ be the hamming distance of the group-i of the pairs (x, x') and (x, x") respectively. Then the sequence $h'_1, h'_2, \ldots, h'_{N/n}$ is a permutation of the sequence $h''_1, h''_2, \ldots, h''_{N/n}$. The collision probabilities of the level-1 (top level) gates are independent of their group numbers as the gates are chosen uniformly at random for every group position. Hence the collision probabilities of the tree gates for the pairs (x, x') and (x, x") are equal. Thus, $$P^f[(y, y')|(x, x')] = P^f[(y, y')|(x, x")] \quad (6)$$

But, $$P^f[(x, x')|(y, y')] = \frac{P^f[(y, y')|(x, x')]P[(x, x')]}{P^f[(y, y')]},$$

Using the result of Equation 6, $$P^f[(x, x')|(y, y')] = \frac{P^f[(y, y')|(x, x')]P[(x, x')]}{P^f[(y, y')]},$$

But, P[(x, x')]=P[(x, x")] as both are in the same group-equivalence class. Thus, $$P^f[(x, x')|(y, y')] = \frac{P^f[(y, y')|(x, x")]P[(x, x")]}{P^f[(y, y')]}, \quad (7)$$

$$P^f[(x, x')|(y, y')] = P^f[(x, x")|(y, y')]$$

The construction of group-equivalence class ensures that every group is equally probable and every bit within a group is equally probable or in other words the number of transitions for every bit within a group-equivalence class is same. Hence from Equation 7, $$P^f[x_i = x'_i|(y, y')] = P^f[x_j = x'_j|(y, y")] \quad (8)$$

3.3.8 Neighborhood Probability:

Definition 3.11 (Key hamming distance). We define the hamming distance of key κ and κ' as the number of gate configurations they differ. The operator $\Delta_k$ returns hamming distance of keys κ and κ'.

In order to use the function family $F_n^N$ in cryptographic functions neighborhood property needs to be studied.

Definition 3.12 ({$d_x$, $d_y$, $d_k$}-neighborhood probability). Let x, y, κ and x', y', κ' be any two sets s.t. y=$f_\kappa$(x) and y'=$f_{\kappa'}$(x').

Let h( ) be the bit-hamming distance function. Then their neighborhood probability is defined as $p_{coll}^{\{d_x, d_y, d_k\}} = P[h(y, y') = d_y | \Delta_k(\kappa, \kappa') = d_k \cap h(x, x') = d_x]$. Note that this probability is averaged over all the inputs and all possible key pairs.

Deriving a generic expression for {$d_x$, $d_y$, $d_k$}-neighborhood probability is very cumbersome. Hence we will derive only for $d_k$=1. Consider the case when $d_x$=0 and $d_y$=0. Consider a tree Γ in which only a level-1 gate is changed. Then, $$P[\text{collision in } \Gamma] = 1 - P[\text{no collision in } \Gamma] =$$

$$1 - P[\text{no collision in top level} \cap \text{no collision in subsequent levels}] =$$

$$1 - P[\text{no collision in top level}] \cdot$$

$$P[\text{no collision in subsequent levels}] =$$

$$1 - \left(\frac{1}{2} \cdot \left(1 - \frac{2^{n-1} - 1}{2^n - 1}\right) \log_n N - 1\right)$$

$$p_{coll}^{\{0,0,1\}}(\Gamma) = 1 - \left(\frac{1}{2} \cdot \left(\frac{2^{n-1}}{2^n - 1}\right) \log_n N - 1\right) < 1 - \left(\frac{1}{2}\right)^{\log_n^N}$$

But every configuration in the key is reused $$\frac{N-1}{n-1}$$

times. Hence, $$p_{coll}^{\{0,0,1\}} < P[\text{collision in } \Gamma]^{\frac{N-1}{n-1}}$$

$$< (p_{coll}^{\{0,0,1\}}(\Gamma))^{\frac{N-1}{n-1}}$$

$$< \left(1 - \left(\frac{1}{2}\right)^{\log_n^N}\right)^{\frac{N-1}{n-1}}$$

Note that in the above expression the inequality arises due to the following fact. Not all the $$\frac{N-1}{n-1}$$

copies of the same configuration will be present in the top level and as the level where the gate is present increases the collision probability decreases. Hence the collision probability calculated by keeping all the gates in the top level becomes upper bound.

Similarly, $$p_{coll}^{\{0,d_y,1\}} < \binom{\frac{N-1}{n-1}}{d_y} \cdot (p_{coll}^{\{0,d_y,1\}}(\Gamma))^{\frac{N-1}{n-1}d_y} \frac{1}{2^{d_y}} \quad (9)$$

$$p_{coll}^{\{0,d_y,1\}} < \binom{\frac{N-1}{n-1}}{d_y} \cdot \left(1 - \left(\frac{1}{2}\right)^{\log_n^N}\right)^{\frac{N-1}{n-1}d_y} \cdot \frac{1}{2^{d_y}}$$

The neighborhood probability for an input change of $d_x$ and key hamming distance of 1 can be estimated as follows. From the Property 3.3.4 the maximum collision controllability is $$\left(1 - \left(\frac{2^{n-1}}{2^n - 1}\right)^{\log_n^N}\right)^N.$$

Since the key has a hamming distance of $$1, \frac{N-1}{n-1}$$

configurations would have changed from $f_\kappa$ to $f_{\kappa'}$. When the configurations are different the collision probability increase from $$\frac{2^{n-1}-1}{2^n - 1} \text{ to } \frac{1}{2}.$$

Hence by taking the upper bound of the collision probabilities of the trees ($\Gamma$) which are affected by the configuration change we can find upper bound to $p_{coll}^{\{d_x,0,1\}}$. Hence, $$p_{coll}^{\{d_x,0,1\}} < \left(1 - \left(\frac{2^{n-1}}{2^n-1}\right)\log_n N\right)^{N-\frac{N-1}{n-1}} \cdot \left(\frac{1}{2}\right)^{\frac{N-1}{n-1}} \quad (10)$$

$$p_{coll}^{\{d_x,0,1\}} < \left(1 - \left(\frac{1}{2}\right)\log_n N\right)^{N-\frac{N-1}{n-1}} \cdot \left(\frac{1}{2}\right)^{\frac{N-1}{n-1}}$$

The other useful inequality is $$p_{coll}^{\{d_x,d_y,1\}} \leq p_{coll}^{\{d_x,0,1\}} \quad (11)$$

This is because the collision probability of every tree is always greater than $$\frac{1}{2}$$

and forms the upper bound.

3.3.9 Bias Propagation:

From the Property 2.2.10 of the set $G_n^b$ the bias at the output of a gate $g \in G_n^b$ is less than the input bias. Thus the bias reduces as it propagates through the gates. In $F_n^N$ the bias of every tree $\Gamma$ is independent. In a tree there are $\log_n N$ levels of gates hence the output bias is lesser than the input bias.

3.3.10 Observability Weakness:

One of the main design goals of $F_n^N$ is to make every output bit as function of all the input bits. The second design goal is to minimize the number of configurations. These two design goals itself forms the weakness of the function family. Consider a black box implementation of $f_\kappa \in_R F_n^N$. In order to identify the secret (configurations) the approach would be to generate a pair of inputs x, x' such that they differ in only one group (say i) i.e., $\Delta_g(x, x')=1$. Let $y=f_\kappa(x)$, $y'=f_\kappa(x')$ be the outputs and $r=grp(x, i)$ and $r'=grp(x', i)$. Let $b=y \oplus y'$ be the difference in the outputs and $b_j$ represent $j^{th}$ bit of b. Then if $b_j=1$ then the configuration in $\gamma_{1,i}(\Gamma_i)=\kappa_k$ differs in rows r and r', i.e., $\kappa_k[r] \neq \kappa_k[r']$. The expected number of 1's in b is nothing but $N \cdot (1-p_{coll}^g)^{\log_n N}$. Hence to find out about the characteristic of all the N configurations for the rows r and r' a minimum of $$\frac{1}{(1 - p_{coll}^g)\log_n N}$$

is needed. Hence by doing this experiment for all $2^{n-1}$ unique pairs of r and r' it is possible to find out which rows are similar and which rows are different. Once the relationship between the rows are identified the key space reduces to $2^{2^N}$ bits. This is much smaller compared to the actual key space $|G_n^b|^N$.

3.3.11 Strength of $f^{(2)}$, $f \in F_n^N$

Observability: The weakness described in Section 3.3.10 arises due to the fact that the inputs to the top level gates ($\gamma_{1,i}(\Gamma)$) are controllable and the transitions (or switching) at the output of top level gates ($y(\gamma_{1,i}(\Gamma))$) are observable at the output of the tree ($y(\Gamma)$). Thus the controllability and observability should be de-linked in order to improve the strength of the function. Precisely this is achieved by the function composition $f^{(2)}$.

In $f^{(2)}$, let x be the input, y be the output, and z be the output at midpoint i.e., $y=f^{(2)}(x)$ and $z=f(x)$. The observable output y does not provide any information about the switching of any particular intermediate bit $z_i$ since all of them are equally probable to switch as shown in output-symmetry property (Property 3.3.7). The function family $F_n^N$ also is input-symmetric (Property 3.3.6) hence the adversary can not control the intermediate bits in a biased manner to observe its effect at the output. Thus the method used to extract information about top level gates truth table rows as explained in Section 3.3.10 is not applicable to $f^{(2)}$. We believe that given polynomial input output pairs of $f^{(2)}$ deciphering f is an NP-hard problem. But we do not have a proof for this property at this time.

Neighborhood probability dispersion: The composition $f^{(2)}$ or in general $f^{(n)}$ decreases (or disperses) the neighborhood collision probability. In effect the composition makes the distribution more uniform and random. Let $y=f_\kappa^{(2)}(x)=f_\kappa(z)$ where $z=f_\kappa(x)$. Then $$p_{coll}^{\{0,d_y,1\}}(f^{(2)}) = $$

$$\sum_{i=0}^{\frac{N-1}{n-1}} P[h(y, y') = d_y \mid h(z, z') = i] \cdot P[h(z, z') = i] = \sum_{i=0}^{\frac{N-1}{n-1}} p_{coll}^{\{0,i,1\}} p_{coll}^{\{i,d_y,1\}}$$

From Equations 9, 10, and 11, $$\sum_{i=0}^{\frac{N-1}{n-1}} p_{coll}^{\{0,i,1\}} p_{coll}^{\{i,d_y,1\}} \leq p_{coll}^{\{0,d_y,1\}} \sum_{i=0}^{\frac{N-1}{n-1}} p_{coll}^{\{0,i,1\}} \leq p_{coll}^{\{0,d_y,1\}}$$

Thus, $$p_{coll}^{\{0,d_y,1\}}(f^{(2)}) \leq p_{coll}^{\{0,d_y,1\}} \quad (12)$$

The other way to look at this is using the bias propagation property (Property 3.3.9). As more and more levels of gates are added the bias will be decreasing and the collision probability approaches $$\frac{1}{2}$$

for every output bit.

4 REBEL Function Family $R_n^{2N}$

Definition 4.1 ($R_n^{2x}$ function family). $R_n^N$ is a $I_{2N} \mapsto I_{2N}$LR-network [8,4] of $f^{(2)}$ with 4 levels, where $f \in F_n^N$.

4.1 Construction of $R_n^{2N}$

Let $\kappa \in K$ be the key that chooses the function $f_\kappa \in F_n^N$. Let $g_\kappa$ be the function defined as follows, $g_\kappa(x_{|L} \bullet x_{|R}) = x_{|R} \bullet (x_{|L} \oplus f_\kappa^{(2)}(x_{|R}))$ Let s be a swapping function, such that, $s(x_{|L} \bullet x_{|R}) = x_{|R} \bullet x_{|L}$.

Figure 5:
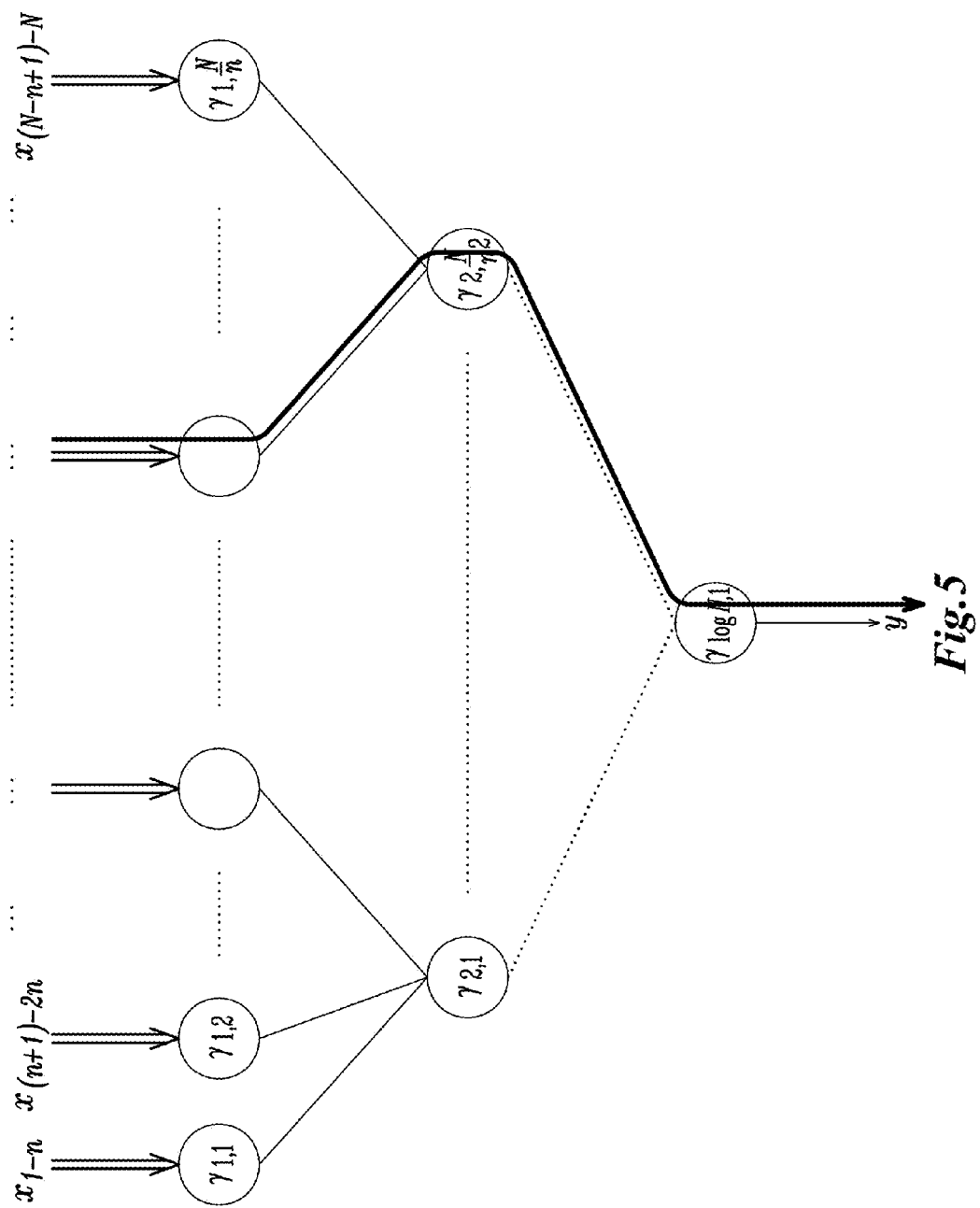
FIG. 5 is one of the maximum controllability Paths in $\Gamma$.

Then the encryption function $E_\kappa \in R_n^{2N}$ is constructed as, $E_\kappa = g_\kappa^{(4)} \circ s$. The decryption function $D_\kappa \in R_n^{2N}$ is same as the $E_\kappa$. FIG. 5 shows the diagrammatic representation of $E_\kappa$ and $D_\kappa$.

4.2 Adversary Models

The aim of the adversary in any cryptosystem is obtain an algorithm to extract the secret (or key) of the family. We define two kinds of adversary models distinguished based on its capabilities.

Definition 4.2 (function oracle $O_f$). Oracle $O_f$ performs encryption ($E_\kappa$) and decryption ($D_\kappa$) for a randomly chosen key $\kappa \in K$. Every query to $O_f$ is a tuple (x, e) where, $x \in I_{2N}$ and $e \in \{1,0\}$. The oracle returns $y = e \cdot E_\kappa(x) + \bar{e} \cdot D_\kappa(x)$ where $y \in I_{2N}$.

Definition 4.3 (unbounded statistics oracle $O_s$). Oracle $O_s$ has access to the input-Output table for the entire key-space K. Specifically, the model maintained by $O_s$, $M(O_s)$ consists of a set of triples $\{(x, y, \kappa) | x \overset{\kappa}{\Rightarrow} y\}$ where $x \overset{\kappa}{\Rightarrow} y$ implies that x maps to y with key $\kappa$. The query to $O_s$ is an arbitrary set Q of input-output pairs, potentially chosen adaptively, i.e., $Q = \{(x, y) | x, y \in I_{2N}\}$ such that $|Q| = l_q$. The oracle returns a set of keys $\kappa_Q$ which are consistent with the input-output relations in the query set Q. Let $|\kappa_Q| = l_r$.

Definition 4.4 (poly time statistics oracle $O_s^P$). Oracle $O_s^P$ is similar to the unbounded statistics oracle $O_s$ except that it only has polynomial time to build its static model of the input-output table with the key-space K correlation. For instance, it can choose to develop the correlation for a given key $\kappa_{i_0}$ with respect to polynomially many input, output pairs. Or it can choose to develop this correlation for a constant number of input-output pairs for polynomially many key values. Hence the cardinality of its model, $|M(O_s^P)|$, is polynomially bounded. The query to $O_s^P$ is a set of input-output pairs, $Q = \{(x, y) | x, y \in I_{2N}\}$ such that $|Q| = l_q$. The number of queried input-Output pairs $l_q$ is of course polynomially bounded due to the poly time constraint. The oracle returns a set of keys $K_Q$ from within its model which are consistent with the input-Output relations in the query set Q. If none match then an empty set is returned. Let $|\kappa_Q| = l_r$.

Definition 4.5 (poly-time static adversary). A polynomial time static adversary (PTSA) has access to both oracles $O_f$ and $O_s$. The adversary performs p(N) queries to $O_f$ for a polynomial p(N). These queries help the adversary build a query set Q for $O_s$. The adversary has to decipher the secret (or key) based on the result of $O_s$.

Definition 4.6 (poly-time runtime adversary). A polynomial time runtime adversary (PTRA) has access only to $O_f$. The adversary performs polynomially in N many queries to $O_f$ and based on the input-output relation has to infer the secret (or the key).

4.3 Complexity Analysis (PTRA)

Let x, $y \in I_{2N}$ and $y = E_\kappa(x)$. From the construction of $E_\kappa$, $$y_{|R} = x_{|L} \oplus f_\kappa^{(2)}(x_{|R}) \oplus f_\kappa^{(2)}(x_{|R} \oplus f_\kappa^{(2)}(x_{|L} \oplus f_\kappa^{(2)}(x_{|R})))$$

$$y_{|L} = x_{|R} \oplus f_\kappa^{(2)}(x_{|L} \oplus f_\kappa^{(2)}(x_{|R})) \oplus f_\kappa^{(2)}(y_{|R})$$

In order to derive any information about the key, which is essentially configurations to the reconfigurable gates, the adversary has to be able to control the input and observe its effect on the output for these component gates. The construction of $E_\kappa$ ensures that if the input to a gate is controllable then the output is not observable. Hence, the adversary with polynomially many trials can not learn any information about the input output relation of component gates.

The only observable effect of $f_K$ is its collision. If the adversary chooses a pair $x_{|L}$, $x'_{|L}$ such that $f_\kappa^{(2)}(x_{|L} \oplus f_\kappa^{(2)}(x_{|L} \oplus f_\kappa^{(2)}(x_{|r}))) = f_\kappa^{(2)}(x_{|R} \oplus f_\kappa^{(2)}(x'_{|L} \oplus f_\kappa^{(2)}(x_{|R})))$ then $y_{|R} \oplus x_{|L} = y'_{|R} \oplus x'_{|L}$. From the Property 3.3.4 of $F_n^N$ the maximum collision probability occurs when the minimum number of gates on the top level are exercised. Let, x, x' be the input to the function $f_K$, then the collision probability is maximum if the difference (or change) occurs in only one of the group ($\Delta_g(x, x') = 1$).

The adversary can determine that two rows of all the N top level gates collide if such an event can be identified. But the existence of $f_\kappa^{(2)}(x_{|R})$ masks input to the second function $f_\kappa^{(2)}(x'_{|L} \oplus f_\kappa^{(2)}(x_{|R}))$. Let E be the event such that the adversary can determine that all the N gates collide in two rows r, r'. This can be considered as partial key extraction, as this information could be used to further reduce the search space in a brute force attack. Let $x_{|L}$ and $x'_{|L}$ differ in group i and let $grp_i$ operator return the $i^{th}$ group. Then, $P[E] = P[(x_{|L}, x'_{|L}$ cause collision in N gates) $\cap (r = grp_i(x_L \oplus f_\kappa(x_{|R})))]$. Probability of the event $r = grp_i(x_{|L} \oplus f_\kappa^{(2)}(x_{|R}))$ is nothing but $$\frac{1}{2^n}.$$

In order to find E the following experiment is performed. Choose $x = x_{|L} \bullet x_{|R}$ uniformly at random from the set $I_{2N}$. Choose $$i \in \left[1, \frac{N}{n}\right]$$

at random. Then generate $$\binom{2^n}{2}$$

pairs of queries to $O_f$ such that $x'_{|L}$ differ with $x_{|L}$ only in bin i. If a collision occurs at the output, the collision could be caused by the first level gates or the subsequent gates. To verify whether top level has caused the collision generate N pairs at random such that bin i has the same values as $x_{|L}$ and $x'_{|L}$. If the collision is caused by top level gates then every pair will collide. If any one of these pairs does not cause collision then the top level gates have not collided.

Then, $$P[E] = \binom{2^n}{2} \cdot \left(\frac{2^{n-1} - 1}{2^n - 1}\right)^N \cdot \frac{1}{2^n} < \frac{1}{2^{N-n+1}}$$

Note that this probability is not affected by the number of trials the adversary is performing, as it is determined by the properties of $G_n^b$.

Once the adversary has identified a collision between rows r and r', the adversary has to guess the actual values of truth table configuration. And the probability of success is $$\frac{1}{2^N},$$

Hence, the probability of successfully guessing two rows of truth tables in all the N gates is bounded by $$\frac{1}{2^{2N-n+1}}$$

$$P[\text{identifying two rows } r \text{ and } r' \text{ of } N \text{ gates}] < \frac{1}{2^{2N-n+1}}$$

4.4 Statistical Adversary Advantage

In this section, we develop an attack framework for an adversary deploying the statistical oracles $O_s$ and $O_s^P$.

A few observations are in order. For a given input-output pair (x, y), the probability that the instantiated key $\kappa_{inst}$ collides with another key $$\kappa, \text{i.e., } P[E_{\kappa_{inst}}(x) = E_\kappa(x)] = \frac{1}{2^{2N}}.$$

This follows from the Property 3.3.2. Thus the expected number of keys that will collide for any given input-output pairs is $$\frac{|G_n^b|^N}{2^{2N}}$$

and for k pairs, $$\frac{|G_n^b|^N}{2^{2Nk}}.$$

Thus with polynomially many input-output pairs (for n=4, k≈6) the adversary can get the correct key if the adversary has access to the unbounded statistics oracle $O_s$. However, the unbounded model $M(O_s)$ will take unrealistic space and time resources. Hence, we will use the poly bounded oracle Or instead.

Once the oracle is limited to build a model consisting of polynomially many tuples (x, y, κ), it is very unlikely that it can provide the key association for a randomly chosen (x, y) by the adversary. Note that the adversary can evaluate an arbitrary instance of $E_{\kappa_{inst}}(x)$ or $D_{\kappa_{inst}}(y)$ through $O_f$. Hence we do not make any distinction between chosen plaintext or chosen ciphertext attacks. The adversary has to rely upon $O_s^P$ to extract any key association with the input-output pairs. The (x, y, κ) space is very large, $2^{2N}*2^{2N}*|G_n^b|^N$. Hence, a polynomially bounded oracle has negligible probability that any triples held by it that match on (x, y) pair will also match with respect to the key $\kappa_{inst}$. This leads to $O_s^P$'s inability to help the adversary. The most interesting issue here, then, is what other information can $O_s^P$ provide the adversary, even though it does not contain a consistent (x, y, κ) triple. Any such information is useful if it infers a significant fraction of the key bits.

Figure 6:
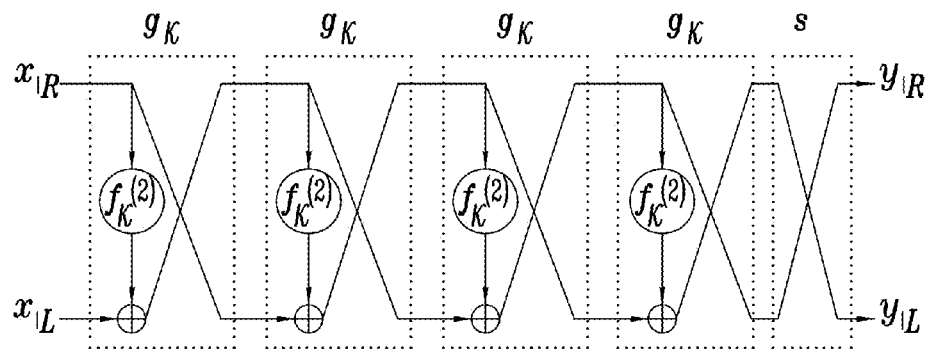
FIG. 6 is diagrammatic representation of $E_K$ and $D_K$ in $R_n^{2N}$.
Figure 7:
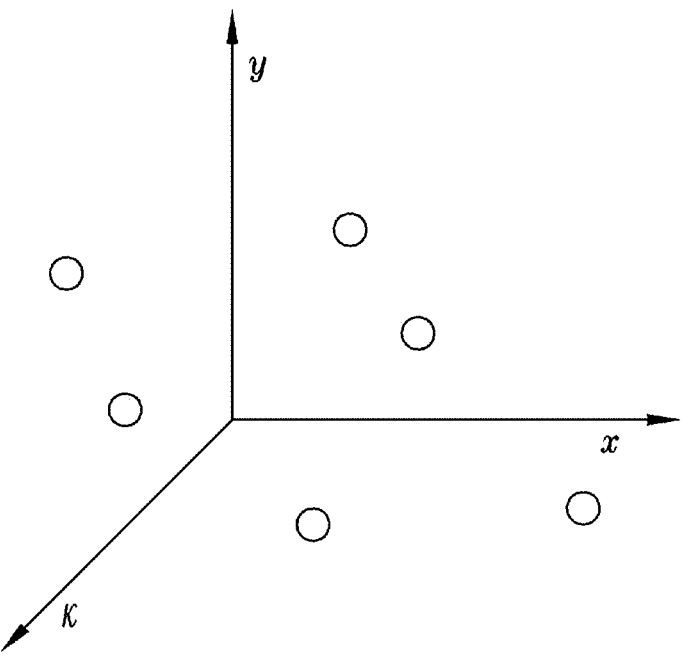
FIG. 7 is (x, y, κ) neighborhood bubbles.

The neighborhood property of the $E_\kappa$ can be exploited by the model in this respect. The reason such neighborhoods help the adversary is that the oracle does not need to have an exact match for (x, y) in its model any more (which is an unlikely event as we argued). Even if it contains a triple (x+Δx, y+Δy, κ)) whose input-output component is from the neighborhood of the query (x, y), it can report back the key of this triple, κ, to the adversary. The adversary gains significant information about $\kappa_{inst}$ from κ since it is likely that $\kappa_{inst}$=κ+Δκ. Depending on the size of the neighborhood, Δκ, the adversary has a much more tractable problem at hand. The efficiency of this exploration depends on the structure of these neighbor-hoods. FIG. 6 illustrates this issue.

Smaller the neighborhoods, more unlikely it is for the oracle to hold a matching triple in its model from such a neighborhood of the query. Larger neighborhoods will make it more likely that a matching triple from such a neighborhood will be found by the oracle. The adversary will, however, then have to explore the entire neighborhood bubble to determine the full key $\kappa_{inst}$. What we will show in this section is that such neighborhoods do not exist in the proposed function family with large probabilities. This makes any experimentation with $f_\kappa$ equivalent to a random experiment. In other words, success probabilities for an adversary even with a poly bounded statistical oracle are almost as good as they would have been with a random search for the key.

From Properties 3.3.8 and 3.3.11 we see that the neighborhood probability gets dispersed with more levels of function compositions. In $E_\kappa$ at least 4 levels of function ($f_K$) compositions are there in both the paths (left and right). Hence the neighborhood probabilities estimated for $f_K$ will form the upper bound for $E_\kappa$.

Definition 4.7 (modified poly bounded oracle). We modify the poly bounded $O_s^P$ oracle as follows. On a query (x, y), it returns a triple within its model $(x_{(i)}, y_{(i)}, \kappa_{(i)}) \in M(O_s^P)$ such that $h(x, x_{(i)}) + h(y, y_{(i)})$ is minimized over $\forall i$.

Lemma 4.1 (statistical adversary advantage). A poly bounded adversary with a poly bounded oracle has probability at most $$\frac{N^c}{\left(1-\left(\frac{1}{2}\right)^{\log_n N}\right)^{N\frac{N-1}{n-1}} \cdot \left(\frac{1}{2}\right)^{N\frac{N-1}{n-1}} 2^{2N} \cdot 2^{2N} \cdot |G_n^b|^N}.$$

The proof follows from Equation 10 and from the fact that (x, y, κ) space has size $2^{2N}*2^{2N}*|G_n^b|^N$. The main point to note here is that the adversary is almost as well off as it would be in a completely random experiment. Hence, such a polynomially resource bounded oracle adds marginally to an adversary's capability for the REBEL functions due to lack of any non-uniformity.

4.5 Resilience to Cryptanalysis

In this section we investigate the resilience of REBEL functions towards the well known cryptanalysis methods. First we will show the class of attacks which use the invariance property of system, i.e., the idea of these attacks is to find the properties of the system which are not dependent or least dependent either on the secret or the input.

4.5.1 Linear Cryptanalysis

Linear cryptanalysis is a general form of cryptanalysis based on finding affine approximations to the cipher function. The technique [10] has been applied to attack ciphers like FEAL [11] and DES [12]. Linear cryptanalysis exploits the high probability of occurrences of linear expressions involving plaintext, ciphertext, and sub-key bits. This attack becomes possible on the conventional cipher function design as the key bits are primarily XOR'ed with round inputs. And linear approximations of known components (S-boxes) in the system further aid the analysis. In the case of REBEL none of these required conditions are available. Every gate (component gates of tree) is chosen by key and hence no linear approximation is possible.

4.5.2 Differential Cryptanalysis

Differential cryptanalysis [2] exploits the property of difference being propagated from input to the output of the cipher function. his attack again requires the properties of the known components in the system (S-boxes) in order to estimate the difference propagation probabilities. In REBEL such an analysis is not possible as there are no known components in the system. A variant to this attack is impossible difference attack [1] which again uses the principle of identifying differences that does not propagate from input to output.

4.5.3 Boomerang Attack

This attack [15] relies on the difference analysis of round function properties and existence of some block in the system which is independent of the input to cipher function. This can be thought of as meet-in-the middle version of differential cryptanalysis. Again REBEL is resistant as there are no blocks (gates) in the system that is either independent of key or the input.

4.5.4 Sliding Attack

This attack [3] exploits the weakness of the round functions. It assumes that given two pairs P, C and P', C' such that P'=f(P) and C'=f(C) then the round function can be deciphered or at least significant bits of the keys can be extracted. These attacks once again uses the property of round functions being built using some know components (S-boxes) and key bits being used only in XOR operations.

In REBEL the round function constitute $f_\kappa^{(2)}$. As shown in Section 3.3.11 the round function can not be deciphered given a polynomial sized set of input output pairs. Hence sliding attack is also ineffective against REBEL.

4.6 Pseudorandomness

A permutation generator informally is pseudorandom if no polynomial time probabilistic adversary can distinguish it from a random permutation. Pseudorandomness is a desirable characteristic since it rules out predictable models for an adversary. In this section, we show that REBEL is a pseudorandom permutation generator.

We will use the Luby, Rackoff [8] result to establish the pseudorandom permutation property. Luby and Rackoff show that if the constituent function in a LR network is pseudorandom then the resulting permutation is also pseudorandom. Since REBEL is constructed as an LR network with the function $f^{(2)}$ where $f \in F_n^N$, it will suffice to show that $f \in F_n^N$ is a pseudorandom function. In the following, we will establish that it is difficult to distinguish between a function $f \in F_n^N$ and a random function only with polynomially many observations. Our notion of pseudorandomness closely resembles that of Goldreich, Goldwasser, Micali [6] in as much as we show that the pseudorandom function is indistinguishable from a random one under all efficient black-box attacks. The adversary can observe the output of the function at polynomially many input instances. Specifically, we demonstrate the indistinguishability with respect to the key property of balance.

The key issue for an adversary is to be able to distinguish a random function from the universe of the $2^{2^N}$ Boolean N-bit functions $U^N$ from a function from $G_N^b$. Note that technically we are dealing with functions of n output bits, not Boolean, and with $F_n^N$ and not $G_N^b$. However, as we will see, both are reasonable simplifications. The following experiment describes the pseudorandomness requirement. The following steps are repeated polynomially many p(N) times. (1) Oracle chooses a function f either from $F_n^N$ or from $U^N$ with equal probability; (2) Adversary specifies an input vector $\vec{x}_i$; (3) The oracle returns $\vec{y}_i = f(\vec{x}_i)$; (4) The adversary guesses whether $\vec{y}_i$ is output by a function from $F_n^N$ or from $U^N$. Let $p_s$ denote the probability with which the adversary makes the correct determination. The adversary's advantage is captured by $|p_s - \frac{1}{2}|$.

We need to show that the adversary's distinguishing probability $|p_F(f) - p_U(f)|$ is asymptotically 0. In other words, a function $f \in F_n^N$ appears like a function in $U^N$ to the adversary with asymptotic probability 1. To that end, we need to characterize a random function from the universe $U^N$, specifically with respect to the observability of its balance. In the following, we claim that the average function in $U^N$ is balanced within $2^{N/2}$ ($2^{N/2}$-balanced), i.e., $\|\{\vec{x}_i \text{ s.t. } f(\vec{x}_i)=1\}| - |\{\vec{x}_i \text{ s.t. } f(\vec{x}_i)=0\}\| \leq 2^{N/2}$ for an average $f \in U^N$ Note the implicit definition in the preceding for a k-balanced function f which means that $\|\{\vec{x}_i \text{ s.t. } f(\vec{x}_i)=1\}| - |\{\tilde{x}_i \text{ s.t. } f(\vec{x}_i)=0\}\| \leq k$.

Lemma 4.2 (universe balance:). Let $U_k^N$ denote the set of functions in $U^N$ that are k-balanced. For a constant $0.5 < c_0 < 1$, there exists a constant $c_1 > 1$ such that the fraction of $c1.2^{N/2}$ functions is at least $c_0$, i.e., $|U_{c_1 \cdot 2^{N/2}}|/|U^N| \geq c_0$. This implies that majority of functions in $U^N$ have balance lower than the order of $2^{N/2}$.

Proof. The functions in $U^N$ can be classified into $2^N$ disjoint sets $U^N(i)$ of cardinality $$\binom{2^N}{i}$$

with exactly i 0's in the truth table. The set $U^N(2^{N-1})$ with $$\binom{2^N}{2^{N-1}}$$

functions is a balanced set. The sets $U^N(2^{N-1}-k)$ and $U^N(2^{N-1}+k)$ are k-balanced. The key point to note here is that the function $$\binom{2^N}{i}$$

is maximized at the midpoint $i=2^{N-1}$ It drops off slowly around the midpoint for $i \approx 2^{N-1} \pm 2^{N/2}$ In fact, almost all of the $2^{2^N}$ functions of $U^N$ belong to the $\pm 2^{N/2}|$ neighborhood of the midpoint. This will establish that the average imbalance in $U^N$ is no worse than the order of $2^{N/2}$ We will first estimate the cardinality of each of these sets.

We start with the midpoint $U^N(2^{N-1})$, the subset of balanced functions. Its cardinality is $$\binom{2^N}{2^{N-1}}$$

and hence it accounts for $$\binom{2^N}{2^{N-1}} \bigg/ 2^{2^N}$$

fraction of all functions in $U^N$.

$$\binom{2^N}{2^{N-1}}$$

equals $2^N!/(2^{N-1}!*2^{N-1}!)$, which can be rewritten as follows with Stirling's approximation (Gosper's version) [5].

$$\binom{2^N}{2^{N-1}} = \frac{(2^N/e)^{2^N} * \sqrt{(2^{N+1}+1/3)\pi}}{(2^{N-1}/e)^{2^{N-1}} * \sqrt{(2^{N+1}+1/3)\pi} * (2^{N-1}/e)^{2^{N-1}} * \sqrt{(2^{N+1}+1/3)\pi}}.$$

This can be simplified into $2^{2^N}/(\sqrt{\pi}*2^{N/2})$, which implies that fraction of functions from $U^N$ contained in $U^N(2^{N-1})$ is $1/(\sqrt{\pi}*2^{N/2})$. Hence, if all the sets $U^N(2^{N-1}\pm 2^{N/2})$ to collect more than half of the functions in $U^N$. We show that in the following.

Let us estimate the cardinality of $U^N(2^{N-1}-l)$ for $1 \le l \le 2^{N/2}$, which is given by $$\binom{2^N}{2^{N-1}-l}.$$

This is approximated by $$\frac{(2^N/e)^{2^N} * \sqrt{(2^{N+1}+1/3)\pi}}{((2^{N-1}-l)/e)^{2^{N-1}-l} * \sqrt{(2*(2^{N-1}-l)+1/3)\pi} * ((2^{N-1}+l)/e)^{2^{N-1}+l} * \sqrt{(2*(2^{N-1}+l)+1/3)\pi}}.$$

This simplifies to $$\frac{(2^N)^{2^N}}{(2^{N-1}-l)^{2^{N-1}-l} * (2^{N-1}+l)^{2^{N-1}+l} * \sqrt{\pi} \, 2^{N/2}}$$

which further equals $$\frac{\left((2^N)^{2^N}\right)}{\left(\begin{array}{c}(2^{N-1})^{2^{N-1}-l}(1-[l/2^{N-1}])^{2^{N-1}-l} * \\ (2^{N-1})^{2^{N-1}+l}(1+[l/2^{N-1}])^{2^{N-1}+l} * \sqrt{\pi} \, 2^{N/2}\end{array}\right)}.$$

Using the Taylor's series approximation for $e^x \approx (1+x)$ for $x \ll 1$ since $l/2^{N-1} \ll 1$ gives $$\frac{(2^N)^{2^N}}{(e^{-l/2^{N-1}})^{2^{N-1}-l} * (e^{l/2^{N-1}})^{2^{N-1}+l} * \sqrt{\pi} \, 2^{N/2}}.$$

This leads to $$\frac{(2)^{2^N}}{e^{2l^2/2^{N-1}} * \sqrt{\pi} \, 2^{N/2}}.$$

If we choose to cumulate the functions over $2^{N/2}$ of the sets $U^N(2^{N-1}-l)$ for $1 \le l \le 2^{N/2}$, the expected fraction of covered functions approaches 1 in the limit. This fraction has the form $$\frac{1}{\sqrt{\pi} \, 2^{N/2}} * \int_1^{2^{N/2}} \frac{1}{e^{2l^2/2^{N-1}}} \, dl.$$

The integral of the form $$\frac{1}{e^{2l^2/2^{N-1}}} \, dl$$

is best performed as a Taylor series expansion integration. The equivalent expression is $$\sum_{l=1}^{2^{N/2}} \left(1 - \frac{l^2}{2^{N-2}}\right)$$

which approximates to $$\frac{5 * 2^{N/2}}{6}.$$

Hence the fraction of functions covered by the sets $U^N(2^{N-1}\pm l)$ for $0 \le l \le 2^{N/2}$ is approximately $$\frac{1}{\sqrt{\pi} \, 2^{N/2}} * (1 + 2 * 5 * 2^{N/2}/6) \approx .9403.$$

Note that for any other value of $0.5<c_0<1$, the number of sets $U^N(2^{N-1}\pm l)$ included can be tweaked such that $0\leq l\leq c_1*2^{N/2}$ to ensure that $$\frac{10*c_1*2^{N/2}}{6}*\frac{1}{\frac{1}{\pi}2^{N/2}}\geq c_0.$$

In such a case, the imbalance of these functions is at most $c_1*2^{N/2}$.

The next step is to assess that given that the imbalance in a random function is at most of the order of $2^{N/2}$, how likely it is that an adversary will be able to detect this imbalance with polynomially many trials. We show in the following that a function $f\in F_n^N$ appears like a function in $U^N$ with polynomially many observations with asymptotic probability 1, and vice versa.

Lemma 4.3 (function distinguishability). Let a function $f\in F_n^N$ be evaluated $p(N)$ times independently on $p(N)$ unique input vectors $\vec{x}_i$ for $p(N)$ a polynomial in N. The resulting experiment is $S_{p(N)}=X_1+\ldots+X_{p(N)}$ where each $X_i$ contributes a 1 (a 0) with probability $p=\frac{1}{2}(q=1-p=\frac{1}{2})$. The function f will appear to be a function from $$U^N \text{ if } S_{p(N)}\geq p(N)*\left[\frac{1}{2}+\frac{1}{2^{N/2}}\right].$$

This probability $$Pr\left[S_{p(N)}\geq p(N)*\left[\frac{1}{2}+\frac{1}{2^{N/2}}\right]\right]\approx (1-p(N)/2^{N-2}).$$

Proof. The proof is based on Chernoff bound [5] which states that $$Pr\left[S_{p(N)}\geq p(N)*\left[\frac{1}{2}+\frac{1}{2^{N/2}}\right]\right]\approx e^{-p(n)[a\log(a/p)b+b\log(b/q)]}$$

where $a=\frac{1}{2}+\frac{1}{2}^{N/2}$ and $b=(1-a)=\frac{1}{2}-\frac{1}{2}^{N/2}$. This probability is given by $e^{-p(n)*K(a,p)}$. Let us estimate $K(a, p)=[\frac{1}{2}+\frac{1}{2}^{N/2}]*\log(2*[\frac{1}{2}+\frac{1}{2}^{N/2}])+[\frac{1}{2}-\frac{1}{2}^{N/2}]*\log(2*[\frac{1}{2}-\frac{1}{2}^{N/2}])$. This equals $[\frac{1}{2}+\frac{1}{2}^{N/2}]*\log(1+\frac{1}{2}^{(N/2)-1})+[\frac{1}{2}-\frac{1}{2}^{N/2}]*\log(1-\frac{1}{2}^{(N/2)-1})$. We will approximate $\log(1+x)$ by $x$ based on the Taylor's series expansion of $\log(1+x)$ for $x<1$. We then get $[\frac{1}{2}+\frac{1}{2}^{N/2}]*\frac{1}{2}^{(N/2)-1}+[\frac{1}{2}-\frac{1}{2}^{N/2}]*(-\frac{1}{2}^{(N/2)-1})$. This implies that $$Pr\left[S_{p(N)}\geq p(N)*\left[\frac{1}{2}+\frac{1}{2^{N/2}}\right]\right]\approx e^{-p(N)/2^{N-2}}\approx (1-p(N)/2^{N-2}).$$

The proof to show that a function in $U^N$ looks similar to a function in $F_n^N$ will be similar.

Lemma 4.3 establishes that the adversary's advantage is of the order of $p(N)/2^{N-2}$ which implies that REBEL functions are pseudorandom. The LR construction based on the functions from $F_n^N$ to derive $R_n^{2N}$ then becomes pseudorandom permutation by Luby, Rackoff proof [8].

Theorem 4.1. A function $f\in R_n^{2N}$ is a pseudorandom permutation.

4.7 Implementation

The implementation of REBEL may use n-to-1 reconfigurable gates. These reconfigurable gates are implements as $2^n$-to-1 multiplexers and hence the size (as well as delay) increase exponentially with the increase in n. The practicable value of n is 4, as less than that will not have sufficiently rich gate space, and more than that will have very high area and delay penalty. Table 1 lists the properties for two instances of the REBEL function family.

TABLE 1

Properties of two instances of $R_n^{2N}$

| Property | $R_4^{32}$ | $R_4^{128}$ |
| --- | --- | --- |
| $\|G_4^b\|$ | 12870 | 12870 |
| key size (bits) | 256 | 1024 |
| $\|K\|$ | $>2^{218}$ | $>2^{873}$ |
| $\delta_c$ | $\left(1-\left(\frac{8}{15}\right)^2\right)^{16}$ | $\left(1-\left(\frac{8}{15}\right)^3\right)^{64}$ |
| $p_{coll}^f$ | $\approx \frac{1.5}{2^{16}}$ | $\approx \frac{1.075}{2^{64}}$ |

Thus, the present invention provides for using the secret as truth tables of a reconfigurable gate. These gates are deployed in a carefully crafted tree circuit whose security properties can be argued to be close to random (which makes it extremely strong). The fact that the underlying implementation is a circuit also makes it fast (about 10-20 times faster).

The present invention can be used to encrypt data at rates in the vicinity of 128 Gigabits/second (as opposed to 3-8 GBits/second achievable for AES). The security guarantees for the present invention demonstrate probabilities of an adversary's success at $\frac{1}{2}^{\{256\}}$ or lower (as opposed to $\frac{1}{2}^{\{80\}}$ targeted by AES). The present invention may be implemented in any hardware or software system in need of high throughput and secure cryptography (encryption/decryption): ATM cards, cell phones, computer systems, network cards, e-commerce servers, and other types of devices.

The reconfigurable gates of the present invention may be implemented in hardware or software. The present invention may be implemented in hardware in any number of ways including in an ASIC register embodiment, an ASIC SRAM embodiment, an FPGA embodiment, or as logic gates.

Figure 8:
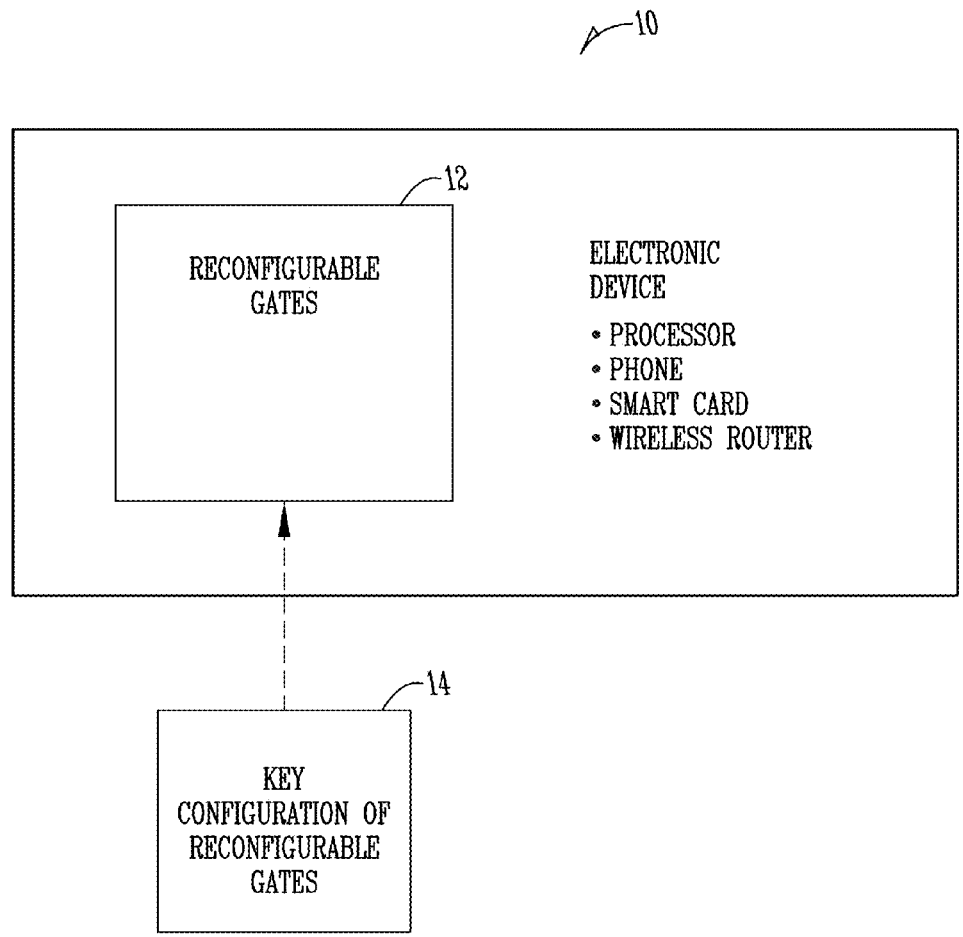
FIG. 8 is a block diagram of one embodiment of the present invention.

FIG. 8 illustrates an electronic device 10. The electronic device may be of any number or types of electronic devices, including a processor, a phone or other communications device, a smart card, or a wireless router or other type of network device. Within the electronic device 10 is a set of reconfigurable gates 12 having an associated function schema. The gates 12 may be reconfigured according to a key 14 which may be in the form of a truth table. The device 10 can be used to perform various cryptographic functions including encrypting and decrypting functions. The function schema may be made public while the key 14 is maintained as a secret.

Therefore an invention directed towards use of reconfigurable platforms in cryptography has been disclosed. The present invention contemplates the use of reconfigurable platforms in cryptography in various ways, particularly where the configuration of the reconfigurable platform is used as a secret or key. The present invention contemplates variations in the structure of the reconfigurable platform and the resulting affect on the cryptographic properties. These and other options, variations, and alternatives are within the spirit and the scope of the invention.

REFERENCES

[1] Eli Biham, Alex Biryukov, and Adi Shamir. Cryptanalysis of Skipjack Reduced to 31 Rounds Using Impossible Differentials. *J. Cryptology*, 18(4):291-311, 2005.
[2] Eli Biham and Adi Shamir. Differential Cryptanalysis of DES-like Cryptosystems. *J. Cryptology*, 4(1):3-72, 1991.
[3] Alex Biryukov and David Wagner. Slide attacks. In *Fast Software Encryption*, pages 245-259, 1999.
[4] H. Feistel. Cryptography and computer privacy. *Scientific American*, 228(5):15-23, May 1973.
[5] W. Feller. *"Stirling's Formula."* 2.9 in An Introduction to Probability Theory and Its Applications, volume Vol. 1, 3rd ed. New York: Wiley, 1968.
[6] Oded Goldreich, Shafi Goldwasser, and Silvio Micali. How to construct random functions. *J. ACM*, 33(4):792-807, 1986.
[7] David Lie, Chandramohan A. Thekkath, Mark Mitchell, Patrick Lincoln, Dan Boneh, John C. Mitchell, and Mark Horowitz. Architectural support for copy and tamper resistant software. In *Architectural Support for Programming Languages and Operating Systems*, pages 168-177, 2000. 1
[8] Michael Luby and Charles Rackoff. How to construct pseudorandom permutations from pseudorandom functions. *SIAM J. Comput.*, 17(2):373-386, 1988.
[9] G. Mahadevan and A. Tyagi. Reconfigurability helps with one-way function and hash function implementations. In *submitted for publication*, 2006. http://www.cs.iastate.edu/tyagi/onewayhash.pdf.
[10] Mitsuru Matsui. Linear Cryptanalysis Method for DES Cipher. In *EUROCRYPT*, pages 386-397, 1993.
[11] Shoji Miyaguchi. The FEAL Cipher Family. In *CRYPTO*, pages 627-638, 1990.
[12] National Bureau of Standards. FIPS PUB 46-3: Data Encryption Standard (DES). *Federal Information Processing Standard*, May 1999.
[13] National Bureau of Standards. FIPS PUB 197: Advanced Encryption Standard (AES). *Federal Information Processing Standard*, November 2001.
[14] G. Suh, D. Clarke, B. Gassend, M. van Dijk, and S. Devadas. aegis: Architecture for tamper-evident and tamper-resistant processing. In *Proceedings of the 17 Int'l Conference on Supercomputing*, pages 160-171, 2003.
[15] David Wagner. The boomerang attack. In *Fast Software Encryption*, pages 156-170, 1999.

What is claimed is:

1. A method for block encryption or decryption, comprising:
　　providing a set of reconfigurable Boolean gates associated with the block encryption or decryption;
　　maintaining function schema based on the set of reconfigurable Boolean gates associated with the block encryption or decryption as public, the function schema comprising functions describing a fixed logic network of the set of reconfigurable Boolean gates;
　　applying an algorithm to determine a set of cryptographically strong configurations for the set of the reconfigurable Boolean gates, wherein the algorithm selects the set of cryptographically strong configurations to meet a plurality of cryptographic properties, wherein the set of cryptographically strong configurations for the set of reconfigurable Boolean gates implements a subset of functions from the function schema;
　　receiving a key as input for use in the block encryption or decryption, the key being a configuration from the set of cryptographically strong configurations, wherein the key comprises a Boolean gate truth table, wherein the Boolean gate truth table implements one or more functions from the function schema;
　　configuring the set of the reconfigurable Boolean gates according to the key to provide the block encryption or decryption;
　　receiving an input block at the set of Boolean reconfigurable gates;
　　performing the block encryption or the decryption of the input block using the set of the Boolean reconfigurable gates configured according to the key to generate an output block; and
　　outputting the output block from the set of Boolean reconfigurable gates.

2. The method of claim 1 wherein the functions comprise pseudo one-way functions.

3. The method of claim 1 wherein the functions comprise pseudo-random functions.

4. The method of claim 1 wherein the reconfigurable Boolean gates are implemented in an electronic device.

5. The method of claim 4 wherein the electronic device is within the set consisting of an embedded processor, a cell phone, a smart card, an ATM card, and a wireless router.

6. The method of claim 1 wherein the encryption or decryption is symmetric.

7. The method of claim 1 wherein the reconfigurable Boolean gates are implemented in a tree circuit.

8. The method of claim 1 wherein the reconfigurable Boolean gates are implemented in software.

9. The method of claim 1 wherein the reconfigurable Boolean gates are implemented in an application specific integrated circuit (ASIC) or a field programmable gate array (FPGA).

10. The method of claim 1 wherein the encryption or decryption provides for independently deriving each bit of a cipher text from a logic tree.

11. A system for block encryption or decryption, comprising:
　　a fixed logic network of reconfigurable Boolean gates adapted for providing a block cipher schema;
　　a configuration associated with the reconfigurable Boolean gates, the configuration defining a secret for use in the block encryption or decryption, the configuration comprising a Boolean gate truth table, wherein the secret is determined by an algorithm to meet a plurality of cryptographic properties making the secret resistant to cryptanalysis attempts;
　　function schema associated with the block encryption or decryption, the function schema maintained as public, the function schema based on the fixed logic network of the reconfigurable Boolean gates, the function schema comprising functions describing the fixed logic network of the reconfigurable Boolean gates;
　　inputs to the set of reconfigurable gates for receiving the configuration;
　　inputs to the set of reconfigurable gates for receiving blocks for encryption or decryption;
　　wherein the system is adapted for receiving the configuration, configuring the reconfigurable gates within the fixed logic network according to the configuration to implement a subset of functions from the function schema, receiving the blocks for encryption or decryption, encrypting or decrypting the blocks when the set of reconfigurable gates is configured according to the configuration, and outputting encrypted or decrypted blocks.

12. The system of claim 11 wherein the configuration further comprises routing control bits.

13. The system of claim 11 wherein the fixed logic network comprises a tree circuit.

14. A method for cryptography, comprising:
providing a reconfigurable hardware platform comprising a set of reconfigurable gates for block encryption or decryption;
maintaining function schema associated with block encryption or decryption as public, wherein the function schema define relationships between the reconfigurable gates and provides for balance and symmetry to thereby make encryption or decryption resistant to cryptanalysis, the function schema comprising functions describing a fixed logic network of the set of reconfigurable gates;
applying an algorithm to determine a set of configurations resistant to cryptanalysis attempts for the set of the reconfigurable gates, wherein the algorithm selects the set of configurations resistant to cryptanalysis attempts to meet a plurality of cryptographic properties, wherein the set of configurations resistant to cryptanalysis attempts implements a subset of functions from the function schema;
receiving as input to the reconfigurable hardware platform a key defining a Boolean gate truth table;
reconfiguring the reconfigurable hardware platform based on the key to implement one or more functions from the function schema;
block encrypting or block decrypting data using the reconfigurable hardware platform configured according to the key: and
providing results of the block encrypting or block decrypting as output from the reconfigurable hardware platform.

15. The method of claim 14 wherein the reconfigurable hardware platform comprises a tree circuit.

16. An electronic device comprising a reconfigurable hardware platform comprised of a set of reconfigurable gates adapted to perform cryptographic functions wherein a configuration of the set of reconfigurable gates of the reconfigurable hardware platform is used as a secret key in performing the cryptographic functions of function schema and the function schema associated with the encryption or decryption and maintained as public and wherein the reconfigurable hardware platform is adapted to receive as input the secret key and reconfigure the set of reconfigurable gates according to the secret key and wherein a key size for the secret key used in performing the cryptographic functions is greater than a block size used in the reconfigurable hardware platform in performing the cryptographic functions, and wherein the function schema provides for balance and symmetry to thereby make the reconfigurable hardware platform resistant to cryptanalysis and wherein the configuration is a cryptographically strong configurations selected to meet a set of cryptographically strong properties for the set of reconfigurable gates, wherein the cryptographically strong configuration implements a subset of functions from the function schema.

17. The method of claim 1 wherein the set of reconfigurable Boolean gates is input symmetric controllable.

18. The method of claim 17 wherein each of the Boolean gates is balanced.

* * * * *